TRANSCEIVER MODULATOR-DEMODULATOR EMPLOYING COMMON ELEMENTS
Filed Dec. 31, 1962
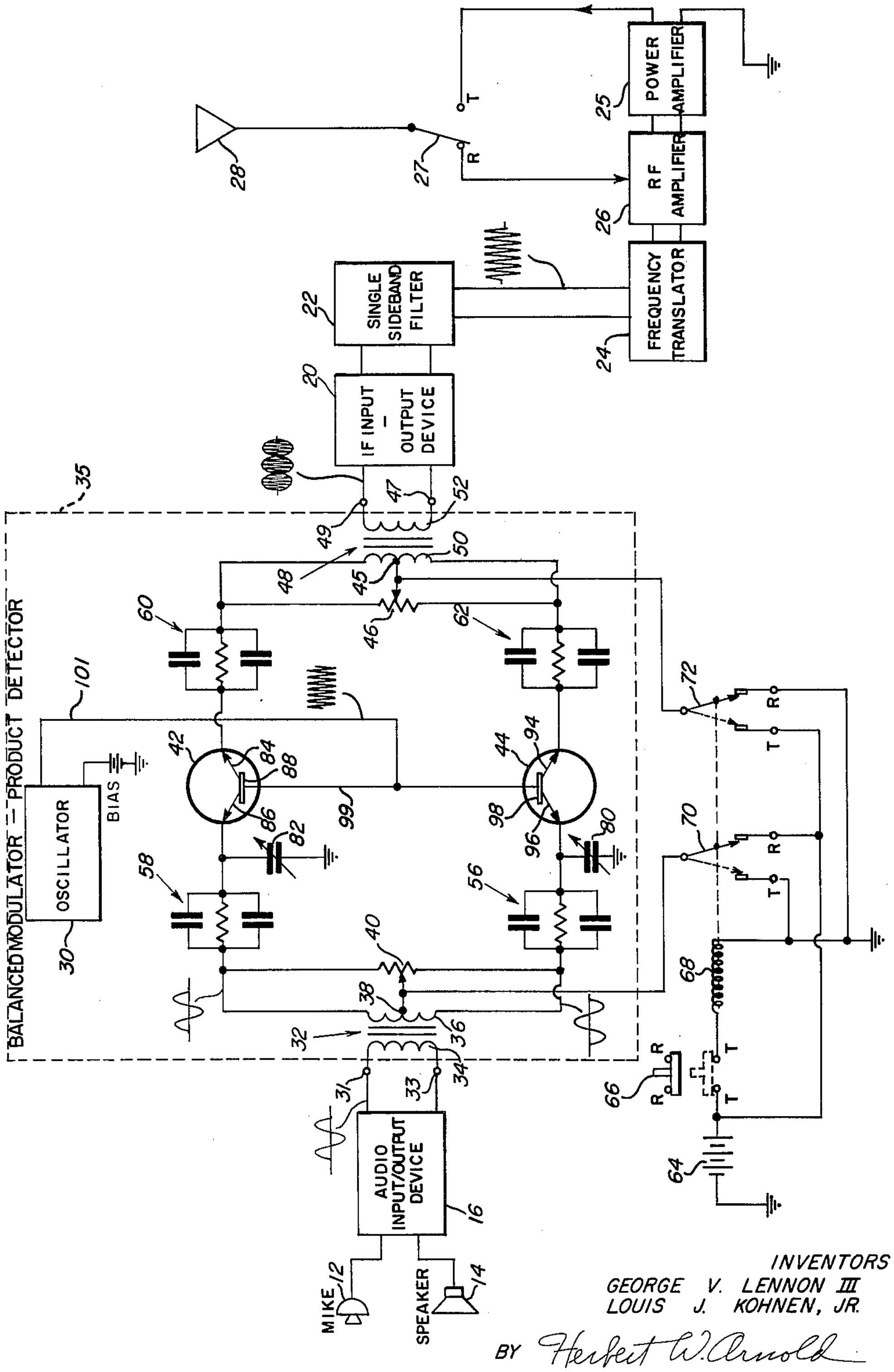
INVENTORS
GEORGE V. LENNON III
LOUIS J. KOHNEN, JR.
BY Herbert W. Arnold
ATTORNEY United States Patent Office 3,219,931

Patented Nov. 23, 1965

3,219,931

TRANSCEIVER MODULATOR-DEMODULATOR EMPLOYING COMMON ELEMENTS

George V. Lennon III, and Louis J. Kohnen, Jr., Rochester, N.Y., assignors to Raytheon Company, Lexington, Mass., a corporation of Delaware Filed Dec. 31, 1962, Ser. No. 248,434

8 Claims. (Cl. 325—18)

This invention relates to communication apparatus and more particularly a modulator and demodulator device for use in a communication transceiver.

In communication apparatus it is often desirable to employ circuitry of a bilateral nature, that is, circuitry that can be employed either in the transmit or the receive mode of operation so as to reduce the amount of circuitry required in the communication apparatus. By employing bilateral circuitry, lighter weight and lower cost of the communication apparatus results.

Accordingly, the communication apparatus of the present invention discloses a bilateral balanced modulator-product detector which operates as a product detector or mixer when receiving communication information and as a balanced modulator when transmitting information. For example, an audio signal from a microphone is presented at the input to the balanced modulator-product detector of the invention in the transmit mode and is modulated by an oscillator so as to translate the audio information to the well known IF frequency prior to subsequent frequency translation to the RF frequency. In the receive mode an IF signal is presented at the balanced modulator-product detector and mixed with the aforesaid oscillator signal so as to produce at the receive output of the balanced modulator-product detector the audio signal.

The bilateral balanced modulator-product detector of the invention employs bilateral transistors for modulating and detecting. Bilateral transistors are current-control devices which by virtue of their bilateral characteristics conduct current with equal facility in either direction. Prior art apparatus employing bilateral transistors in modulator/demodulator circuitry have limited their usefulness by employing the oscillator or carrier signal to lock and unlock the transistor and thereby utilize the transistors essentially as diode or switching devices.

In the apparatus of the present invention the bilateral transistors are utilized as true transistors in a balanced modulator-product detector by reversing the collector-emitter potential from ground to B+ when switching from the transmit to receive mode, thereby realizing a signal gain simultaneously with the signal conversion process of either detecting or translating. Accordingly, the balanced modulator-product detector of the invention employs a multi-electrode transistor device for modulating or demodulating as distinguished from diode modulators or demodulators and hence is characterized by the ability to produce a conversion gain rather than a loss which is typical of diode modulators or demodulators.

Other objects and advantages of the invention will be more readily understood from the following description taken together with the accompanying drawing, in which the single figure thereof is a schematic and block diagram of transceiver apparatus of the present invention.

Referring specifically to the drawing, there is shown a transceiver system of the present invention which for purposes of illustration is a single-sideband-suppressed-carrier (SSBSC) audio transmitter-receiver system employing a novel bilateral balanced modulator-product detector shown within the dotted lines and designated generally by the reference numeral 35.

Before discussing the details of the balanced modulator-product detector circuitry, a general description of the over-all communication system apparatus will be given. Thus, assuming that the apparatus of the drawing is in the transmit mode of operation wherein relay arms 70 and 72 and switch 27 are in the T position, or transmit position, the voice input from a microphone 12 is coupled to audio input-output device 16 which amplifies the voice signal to a suitable level. The amplified signal is coupled to input terminals 31 and 33 of balanced modulator-product detector 35. In the transmit mode of operation bilateral balanced modulator-product detector operates as a balanced modulator to produce a double sideband signal with suppressed carrier at the output leads 49 and 47 of unit 35. The double sideband signal is then amplified in IF input-output device 20 to a suitable level and the amplified double sideband signal is coupled to a single sideband filter 22 wherein one sideband, for example, the upper sideband is attenuated. The lower sideband which appears at the output of filter 22 is applied to the input of frequency translator 24 which is comprised of a series of mixers which convert the IF signal to the desired RF frequency. The translated RF signal out of translator 24 which is at the chosen RF frequency is applied to a succession of low and intermediate RF amplifier stages, all of which are tuned to the desired RF frequency and shown generally as RF amplifier stage 26. The output of the RF amplifier stage is coupled to a power amplifier 25. The driving signal from RF amplifier stage 26 is amplified by the power amplifier 25 and coupled through switch 27 to antenna 28 for propagation to some remote receiver.

In the receive mode of operation relay arms 70 and 72 are switched to the R or receive position. Accordingly, in the receive mode of operation antenna 28 is coupled directly through switch 27 to an input stage such as a tuned transformer circuit of RF amplifier 26 and the received RF signal from antenna 28 is amplified in RF amplifier 26 to a sufficient level so as to overcome thermal noise produced in the frequency translator 24. The amplified RF signal from amplifier 26 is coupled to frequency translator 24 wherein the RF signal is converted or frequency translated to the IF frequency. The IF frequency output from translator 24 is coupled to single sideband filter 22 wherein a suitable IF sideband is selected such as the lower sideband and the unwanted sideband of the received signal such as the upper sideband is attenuated. The lower sideband IF signal from filter 22 is coupled to IF input-output device 20 which provides sufficient amplification of the sideband signal for efficient detection of the audio information on said IF signal by the bilateral balanced modulator-product detector 35 which in the receive mode acts as a product detector. The amplified single sideband IF signal output from device 20 is coupled to terminals 47 and 49 of unit 35, said leads comprising the input to unit 35 in the receive mode. Bilateral balanced modulator-product detector in the receive mode detects the audio signal by mixing the IF signal with the aforesaid signal from oscillator 30. This detected audio signal which is the output from bilateral device 35 in the receive mode is coupled to audio input-output device 16 and amplified therein to the proper level by suitable audio amplifier stages and applied to the loudspeaker 14. This completes the overall description of the transceiver device of the present invention. There follows a detailed description of the particular circuitry comprising the bilateral balanced modulator-product detector 35.

Assuming that it is desired to operate bilateral device 35 in the transmit mode, pushbutton 66 is depressed to the T position as shown in dotted lines, thereby providing energizing voltage from battery 64 to the coils of relay 68. When the relay coil is energized switches 70 and 72 are pulled to the T position as shown in dotted lines, thereby grounding the center tap 38 of transformer 32 and impressing B+ or the voltage from battery 64 on the center-tap 45 of transformer 48. The positive potential at center-tap 45 of transformer 48 is coupled through transformer winding 50 and resistor-capacitor networks 60 and 62 which establishes direct current bias and bypass for high and low frequencies to electrodes 84 and 94 of bilateral transistors 42 and 44 respectively. Bilateral transistors 42 and 44 are normal junction type transistors wherein the collector and emitter areas are made equal, thus resulting in approximately the same amplification efficiency when either terminal is used as a collector. With a positive D.C. voltage coupled in the transmit mode to electrodes 84 and 94 said electrodes act as collectors. In a similar manner, electrodes 86 and 96 of bilateral transistors 42 and 44 are made to act as emitters in the transmit mode by coupling electrodes 86 and 96 to ground through RC bias and bypass networks 58 and 56 through transformer winding 36 to center tap 38 of transformer 32. This center-tap, as aforementioned, is grounded by the action of relay arm 70 in the transmit mode of operation. Base electrodes 88 and 98 of bilateral transistors 42 and 44, respectively, are coupled together by lead 99 which in turn is fed a carrier signal from oscillator 30 by way of line 101. Accordingly, with the transistor biased as aforementioned for the transmit mode of operation wherein electrodes 86 and 96 of bilateral transistors 42 and 44 act as emitters and electrodes 84 and 94 act as collectors, an audio signal input across terminals 31 and 33 is mixed or modulated in transistors 42 and 44 with the carrier or injection signal from oscillator 30 so as to produce the desired double sideband IF signal at output terminals 49 and 47. For example, assuming for simplicity that the audio signal across terminals 31 and 33 is a one kilocycle sinusoidal voltage varying waveform, this waveform is coupled from the primary winding 34 of transformer 32 to the secondary winding 36 in such a manner that two signals of equal and opposite amplitudes are developed between the grounded center-tap of secondary winding 36 and the ends of said winding. One of the two signals thus developed is coupled through RC network 58 to electrode 86 of bilateral transistor 42. The other remaining signal is coupled to electrode 96 of transistor 44, both electrodes being biased to act as emitters in the transmit mode. The carrier or injection frequency from oscillator 30 which may, for example, be a 455 kilocycle signal, is coupled along lines 101 and 99 to base electrodes 88 and 98 of bilateral transistors 42 and 44. The impedance of the emitter-collector electrode circuit is varied in accordance with the instantaneous magnitude of the 455 kilocycle signal from oscillator 30, thereby producing signals at the output or collector circuit of transistors 42 and 44 comprising the audio modulated carrier of 455 kilocycles and sum and difference frequency signals of the 455 kilocycle carrier signal and the one kilocycle modulating signal; that is, an amplitude varying 454 kilocycle lower sideband signal and a 456 kilocycle upper sideband signal. A.C. signals produced at the collector circuit are coupled across the primary 50 of transformer 48 in such a manner that the carrier signal is cancelled out or suppressed by proper balancing of center-tap 45 and the sidebands or sum and difference frequencies are coupled to the secondary 52 of transformer 48. Cancellation of the carrier signal results from the fact that the carrier signal from oscillator 30 is fed in phase to base electrodes 88 and 98, whereas the modulating signal from secondary winding 36 is fed in out-of-phase relationship to electrodes 86 and 96 of transistors 42 and 44, respectively. The resultant modulated signals developed at the collector output circuit of transistors 86 and 96 are fed across transformer primary 50 in push-pull fashion. Potentiometers 46 and 40 provide for balancing of the A.C. impedance with respect to ground of bilateral transistors 42 and 44. Phase balancing of the carrier signal is accomplished by trimmer capacitor 80 which is coupled at one end to electrode 96 of transistor 44 and at the other end to ground.

Bilateral balanced modulator-product detector 35 operates in the receive mode as a product detector which mixes the appropriate single sideband IF signal from IF device 20 with the carrier signal from oscillator 30 to produce a resultant audio signal across output terminals 31 and 33. In the receive mode of operation bilateral transistors 42 and 44 are biased conversely to the biasing arrangement described in connection with the transmit mode. This is accomplished by releasing the Push-To-Talk button 66 to the position designated R—R in the drawing so that voltage from D.C. battery 64 is no longer coupled to relay winding 68, thereby releasing relay arms 70 and 72 to the R or receive position. In the receive position of relay arms 70 and 72, B+ voltage is coupled from battery 64 through arm 70 to the center contact of the secondary 36 of transformer 32 and from there it is divided equally through winding 36 to electrodes 86 and 98 of bilateral transistors 42 and 44 respectively. In like manner, electrodes 84 and 94 of bilateral transistors 42 and 44 respectively are coupled to ground through networks 60 and 62, winding 50 and relay arm 72. Accordingly, it can be seen that in the receive mode of operation of bilateral balanced modulator-product detector 35, bilateral transistors 42 and 44 are biased so that electrodes 86 and 96 act as collectors and electrodes 84 and 94 act as emitters which is the converse of their function in the transmit mode of operation. This is the only switching circuitry required to change the operation of bilateral modulator-product detector 35 from the transmit mode to the receive mode corresponding to the modulator mode and detector mode respectively. Furthermore, it can be seen that essential operation of the transistors as current amplifying devices is not lost in the switching operation. Accordingly, the amplifying characteristics of the bilateral transistors which may, for example, be type 2N1996, can be utilized to obtain a signal gain at the same time the signal is modulated or detected. It is this feature which allows the apparatus of the present invention to be operated with low insertion losses and with appropriate signal conversion gain rather than loss.

With the bilateral transistors 42 and 44 biased as aforesaid for the receive mode of operation, a signal such as a single sideband input signal from IF amplifying device 20 which may be a dual channel amplifier for amplifying in both the transmit and receive mode, is coupled across input terminals 49 and 47 to the primary of transformer 48. From the primary the signal is coupled to center-tap 45 of secondary winding 50 wherein the signal on the primary is divided into equal and opposite amplitude signals. One of the signals developed across center-tapped transformer winding 50 is coupled through RC network 60 to electrode 84 of transistor 42 which electrode in the receive mode acts as an emitter. The other of said signals developed across transformer secondary 50 is coupled through RC network 62 to electrode 94 of bilateral transistor 44 which electrode in the receive mode also acts as an emitter. The carrier signal is applied from oscillator 30 to the base electrodes 88 and 98 of transistors 42 and 44, respectively, in identical manner and of substantially identical amplitude and frequency as that related in connection with the description of the transmitter mode of operation. Accordingly, the carrier frequency signal on the base electrodes of bilateral transistors 42 and 44 serves to vary the impedance of the emitter to collector circuit of said transistors in accordance with the instantaneous magnitude of the carrier signal, producing in the receive mode and in a similar manner as in the transmitting mode, the sum and difference frequencies of the IF and carrier signals. Since in the receive mode the IF signal and the carrier signal are separated by the audio frequency, the difference between the IF and carrier signals is the desired audio signal. However, there are other unwanted mixing products or signals resulting from the mixing process occurring in transistors 42 and 44. The most significant unwanted product is the local carrier signal and suitable means for suppressing said unwanted signal is provided in the balanced circuitry of apparatus 35. Thus, for example, the local carrier signal is suppressed in a manner similar to the suppression of the carrier signal which occurred in the balanced circuit of transformer 48 in the transmit mode. The unwanted carrier products of the detecting process are coupled in-phase from transistors 42 and 44 to both sides of the secondary 36 of transformer 32. The two signals which are made in phase and of equal and of opposite amplitude by adjustment of capacitor 80 and resistor 40 are cancelled out at the center-tap 38 of transformer secondary 36. The desired audio output signals from bilateral transistors 42 and 44 are out-of-phase with respect to one another and are coupled across the secondary of transformer 32 so as to reinforce one another and, accordingly, are coupled from the secondary to the primary 34 of transformer 32 and thence to a suitable audio amplifier stage 16.

This completes the description of the bilateral balanced modulated-product detector of the transceiver of the present invention. However, many modifications of the invention will be apparent to persons skilled in the art. For example, separate battery supplies may be utilized for the relay energization and biasing functions respectively. Furthermore, the microphone 12, speaker 14 and pushbutton 66 may be combined in a suitable telephone handset for convenience of operation and switch 27 may also be switched by the action of relay coil 68 if desired.

Accordingly, it is desired that this invention not be limited except as defined by the appended claims.

What is claimed is:

1. A transceiver operative in a first and a second mode comprising:
   a pair of transformers each having a primary winding and a secondary winding;
   a pair of sources of signals, each being connected to a different one of said transformer primary windings;
   a pair of bilateral transistors each having a first and second electrode and a base electrode and both being operative to mix signals from the same one of said pair of sources with carrier signals applied to said base electrodes during each of said modes;
   means for coupling said first electrode of one of said transistors to a first terminal of one of said secondary windings, and for coupling said first electrode of the other of said transistors to a second terminal of said secondary winding;
   means for coupling said second uncoupled electrode of one of said transistors to a first terminal of a remaining uncoupled one of said secondary windings, and for coupling said second electrode of the other of said transistors to a second terminal of said remaining uncoupled secondary winding;
   means for coupling a carrier signal to the base electrodes of said transistors;
   and means independent of said pair of sources for biasing both of said first electrodes as emitters to produce simultaneous current flow in one direction through both of said transistors and biasing both of said second electrodes as emitters to produce simultaneous current flow in a reverse direction through both of said transistors.

2. A transceiver operative in a first and a second mode comprising:
   a pair of transformers each having a primary winding and a secondary winding;
   a pair of sources of signals, each being connected to a different one of said transformer primary windings;
   a pair of bilateral transistors each having a pair of electrodes and a base electrode and both being operative to mix signals from the same one of said pair of sources with carrier signals applied to said base electrodes during each of said modes;
   potentiometer means connected across the secondary windings of each of said transformers for producing alternating current impedance balancing of said transistors;
   means for connecting the center-tap of each of said secondary windings to the wiper arm of a respective one of each of said potentiometer means;
   means for coupling opposite terminals of said secondary windings to opposite electrodes of said transistors;
   means for coupling a carrier signal to the base electrodes of said transistors;
   and switching means independent of said pair of sources for biasing said center-taps to produce simultaneous current flow in one direction through both of said transistors and for reverse biasing said center-taps to produce simultaneous current flow in a reverse direction through both of said transistors.

3. In combination:
   means for converting acoustic energy to electrical signals;
   a first amplifier means for amplifying said electrical signals;
   a pair of transformers, each having a primary winding and a secondary winding, the primary winding of one of said transformers being coupled to said amplifying means;
   a pair of bilateral transistors each having a pair of electrodes and a base electrode;
   potentiometer means connected across the secondary windings of each of said transformers for producing alternating current impedance balancing of said transistors;
   means for connecting the center-tap of each of said secondary windings to the wiper arm of a respective one of each of said potentiometer means;
   means for coupling opposite terminals of said secondary windings to opposite electrodes of said transistors;
   means for coupling a carrier signal to the base electrodes of said transistors;
   a second amplifier means for amplifying signals on the primary winding of the remaining uncoupled transformer primary winding;
   filter means coupled to said second amplifier for suppressing undesired sidebands of said amplified signal;
   means for frequency translating desired signals from said filter means;
   means for amplifying and transmitting said frequency translated signals;
   and switching means for providing a direct current bias across both of said bilateral transistors to cause simultaneous current flow in one direction through both of said transistors and providing a reverse bias across both of said bilateral transistors to cause simultaneous current flow in the reverse direction through both of said transistors.

4. A transceiver operative in a first and a second mode comprising:
   a pair of transformers each having a primary winding and a secondary winding;
   a pair of sources of signals, each being connected to a different one of said transformer primary windings;
   a pair of bilateral transistors each having a pair of electrodes and a base electrode and both being operative to mix signals from the same one of said pair of sources with carrier signals applied to said base electrodes during each of said modes;
   potentiometer means connected across the secondary windings of each of said transformers for producing alternating current impedance balancing of said transistors;
   means for connecting the center-tap of each of said secondary windings to the wiper arm of a respective one of each of said potentiometer means;

a D.C. power supply means;

biasing means independent of said pair of sources for coupling the center-tap of each of said secondary windings to opposite poles of said power supply to produce simultaneous current flow in one direction through said transistor pair;

and biasing means independent of said pair of sources for reversing the coupling of said center-tap to produce simultaneous current flow in the reverse direction through said transistor pair.

5. In a transceiver operative in a first and second mode:

a pair of transformers each having a primary winding and a secondary winding;

a pair of sources of signals, each being connected to a different one of said transformer primary windings;

a pair of bilateral transistors each having a pair of electrodes and a base electrode and both being operative to mix signals from the same one of said pair of sources with carrier signals applied to said base electrodes during each of said modes;

potentiometer means connected across the secondary windings of each of said transformers for producing alternating current impedance balancing of said transistors;

means for connecting the center-tap of each of said secondary windings to the wiper arm of a respective one of each of said potentiometer means;

means for coupling opposite terminals of said secondary windings to opposite electrodes of said transistors;

means for coupling a carrier signal to the base electrodes of said transistors;

a D.C. power supply means;

biasing means independent of said pair of sources for coupling the center-tap of each of said secondary windings to opposite poles of said power supply to produce simultaneous current flow in one direction through said transistor pair;

and biasing means independent of said pair of sources for reversing the coupling of said center-tap to produce simultaneous current flow in the reverse direction through said transistor pair.

6. A modulator-demodulator comprising:

first, second, and third sources of signals;

a pair of bilateral transistors each being operative to mix signals from two of said sources of signals, each of said transistors having first and second electrodes and a control electrode;

means for applying a signal from said first signal source to the control electrodes of said pair of bilateral transistors;

means for applying a signal from said second signal source to the first electrodes of said pair of bilateral transistors;

means for applying a signal from said third signal source to the second electrodes of said pair of bilateral transistors; and biasing means independent of said sources for simultaneously biasing both of said first transistor electrodes as emitters and both of said second transistor electrodes as collectors to cause both of said transistors to mix first and second signal source signals, and for simultaneously biasing both of said first transistor electrodes as collectors and both of said second transistor electrodes as emitters to cause both of said transistors to mix first and third source signals.

7. A modulator-demodulator operative in a transmit mode and a receive mode comprising:

first, second, and third sources of signals;

a pair of bilateral current control devices each being operative to mix signals from at least two of said sources during each of said modes of operation, each having a control electrode and a pair of electrodes;

means for applying said first source signals to the control electrode of both of said control devices;

input circuit means for applying second source signals to an electrode of both of said control devices;

output circuit means connected to said other electrode of both of said control devices and said third signal source; and, biasing means independent of said signal sources for biasing both of said control devices to cause both of said devices to mix signals from said first and second sources during said receive mode of operation and produce a suppressed carrier signal in said output circuit, and for rebiasing both of said control devices to mix signals from said first and third sources during said receive mode of operation and produce a product detection signal in said input circuit.

8. A modulator-demodulator operative in a transmit mode and a receive mode comprising:

first, second, and third sources of signals;

a pair of bilateral transistors each being operative to modulate signals from two of said sources during each of said modes of operation, each having first and second electrodes and a control electrode;

means for applying said first source signals to the base electrodes of both of said transistors;

means for applying said second source signals to the first electrodes of both of said transistors;

means for applying said third source signals to the second electrodes of both of said transistors; and, switching means independent of said signal sources for biasing both of said transistors to cause both of said transistors to modulate said first and second source signals during said transmit mode of operation to produce a suppressed carrier output signal, and for rebiasing both of said transistors to cause both of said transistors to modulate said first and third source signals during said receive mode of operation to produce a product detection signal, both of said transistors producing signal amplification during both said modulating and detecting operations.

References Cited by the Examiner

UNITED STATES PATENTS

| | | | |
|---|---|---|---|
| 2,780,725 | 2/1957 | Johanson | 329—101 |
| 2,810,081 | 10/1957 | Elliott | 307—88.5 |
| 2,816,238 | 12/1957 | Elliott | 307—88.5 |
| 2,890,418 | 6/1959 | Zawels | 332—47 |
| 2,943,271 | 6/1960 | Willis | 332—43 |
| 3,044,025 | 7/1962 | McCauley | 332—31 |
| 3,115,621 | 12/1963 | Slavin | 307—88.5 X |

FOREIGN PATENTS

| | | |
|---|---|---|
| 485,992 | 5/1938 | Great Britain. |

DAVID G. REDINBAUGH, *Primary Examiner.*

UNITED STATES PATENT OFFICE
CERTIFICATE OF CORRECTION

Patent No. 3,219,931 November 23, 1965

George V. Lennon III, et al.

It is hereby certified that error appears in the above numbered patent requiring correction and that the said Letters Patent should read as corrected below.

Column 8, line 21, for "receive" read -- transmit --.

Signed and sealed this 7th day of February 1967.

(SEAL)
Attest:

ERNEST W. SWIDER
Attesting Officer

EDWARD J. BRENNER
Commissioner of Patents